UNITED STATES PATENT OFFICE.

FRIEDRICH WILHELM EMIL MÜLLER, OF CHICAGO, ILLINOIS.

HAIR-TONIC.

939,431.
No Drawing.

Specification of Letters Patent. Patented Nov. 9, 1909.

Application filed August 6, 1909. Serial No. 511,659.

*To all whom it may concern:*

Be it known that I, FRIEDRICH WILHELM EMIL MÜLLER, a citizen of the United States, residing at 816 Lewis avenue, Austin Station, city of Chicago, in the county of Cook and State of Illinois, have invented a new and useful Hair-Tonic, of which the following is a specification.

My composition consists of the following ingredients, combined in the proportions stated, viz: water substantially pure 10 per cent., ripe black currants 25 per cent., granulated sugar 5 per cent., whisky (best corn) 40 per cent., port wine 20 per cent.

The currants are placed in the whisky and left there for a period of four weeks; the currants are then separated from the whisky by straining and are no longer used; the strained whisky is then thoroughly mingled with the water, sugar and port wine by agitation.

In using the above-named composition a small quantity of the same should be thoroughly rubbed into the scalp with the tips of the fingers several times a day.

By the use of the above composition, hair may be made to grow on bald spots of the head where hair should ordinarily grow; also, by the use of the above named composition on hair which is already growing, the hair will be strengthened and invigorated.

I am not aware that all the ingredients of my composition have been used together for the same purpose.

I claim:

1. A hair tonic, consisting of water, an extract of ripe black currants, granulated sugar, best corn whisky and port wine, substantially in the proportions described and for the purpose specified.

2. A hair tonic, consisting of pure water ten per cent., an extract of ripe black currants, twenty-five per cent., granulated sugar five per cent., best corn whisky forty per cent. and port wine twenty per cent., substantially as described.

FRIEDRICH WILHELM EMIL MÜLLER.

Witnesses:
CHARLES F. LOWY,
ALBERT GOETZ.